United States Patent [19]
Clevenger, Jr.

[11] Patent Number: 5,415,913
[45] Date of Patent: * May 16, 1995

[54] METHOD OF SPLICING ROUND BALER BELTS

[75] Inventor: James T. Clevenger, Jr., Lancaster, Pa.

[73] Assignee: New Holland North America, Inc., New Holland, Pa.

[ * ] Notice: The portion of the term of this patent subsequent to May 3, 2011 has been disclaimed.

[21] Appl. No.: 56,275

[22] Filed: May 3, 1993

[51] Int. Cl.⁶ .......................... B32B 3/06; B30B 9/30
[52] U.S. Cl. .................................. 428/58; 156/304.3; 24/33 P; 24/33 C; 24/31 H; 474/256
[58] Field of Search ................ 428/58; 24/33 C, 33 P, 24/33 K, 33 M, 31 H; 156/304.3; 139/383 AA; 162/904; 474/256

[56] References Cited

U.S. PATENT DOCUMENTS

| | | | |
|---|---|---|---|
| 2,916,136 | 12/1959 | Combs | 24/33 K |
| 4,371,580 | 2/1983 | Morrison et al. | 428/250 |
| 4,518,647 | 5/1985 | Morrison | 428/250 |
| 4,597,137 | 7/1986 | Droppleman et al. | 24/33 P |
| 4,611,367 | 9/1986 | Meulenberg et al. | 24/33 C |
| 4,900,609 | 2/1990 | Arnold | 428/163 |
| 5,327,823 | 7/1994 | Clevenger et al. | 100/88 |

FOREIGN PATENT DOCUMENTS 580718  9/1946  United Kingdom ............... 24/33 C

*Primary Examiner*—Alexander S. Thomas
*Attorney, Agent, or Firm*—Frank A. Seemar; Larry W. Miller

[57] ABSTRACT

A method of splicing a belt in a round baler having a bale forming chamber defined by at least one elongated belt having opposing ends spliced together to form a continuous band. The splice includes a first and a second series of similar side-by-side loops connected to and extending from the respective opposing ends of the belt, and an attaching element extending through both series of loops to maintain the opposing ends of the belt in alignment and close proximity to each other. Retention components affixed to the attaching element retain it in operative relationship to the loops and are disposed outwardly of the outer loops.

6 Claims, 4 Drawing Sheets

METHOD OF SPLICING ROUND BALER BELTS

FIELD OF THE INVENTION

The present invention relates generally to belts used in round balers and more particularly to a method of attaching the ends of an elongated baler belt to form a continuous band.

BACKGROUND OF THE INVENTION

Round balers generally have a bale forming chamber defined by an apron comprising an array of side-by-side belts, transverse slats trained on chains, a plurality of rolls or a combination of these various elements, e.g., rolls and belts. During field operation, crop material such as hay is picked up from the ground as the baler traverses the field, is fed into a fixed or adjustable diameter chamber, rolled into a compact cylindrical bale, wrapped with twine, net or the like and ejected onto the ground for subsequent handling.

Round balers of the general type mentioned above comprising a chamber defined (at least partly) by a plurality of side-by-side longitudinally extending belts supported on a plurality of transverse rollers, frequently utilize belts of a predetermined length with opposing ends attached to form a continuous band. The ends are spliced together by using known methods, one of the most common of which is disclosed in U.S. Pat. No. 4,371,580, issued on Feb. 1, 1983. This method, designated as "Prior Art" and shown in FIG. 2 of the drawings, includes the threading of a rod 2 through first and second series of loops extending from the opposing ends of a belt 3. The ends of rod 2 are then bent to hold it in place and thereby permit the splice to retain belt 3 in its continuous band configuration.

Another known method is disclosed in Publication No. LIT 1217 issued by the Clipper Belt Lacer Company of Grand Rapids, Mich. This method, illustrated in FIGS. 3–5, involves using a clip fastener 4 (FIG. 3), positioning it as shown in FIG. 4 and crimping the extended wing portions of the fastener so positioned to the rod as shown in FIG. 5.

Although prior art round baler belt splice methods have met with varying degrees of success, no solution exists that goes to the root of the problem, i.e., the need for a simple, quick and inexpensive splicing method that enhances the serviceability of round balers and thereby reduces down time which in turn results in an improvement to the overall machine performance.

SUMMARY OF THE INVENTION

An important object of the present invention is to provide a round baler belt splicing method that overcomes the above problem and thereby improves the overall baler performance.

In pursuance of this and other important objects the present invention provides an improved method for splicing belts on a round baler having at least one belt with opposing ends secured together by a splice to form a continuous band. The splice comprises a first and a second series of similar side-by-side loops connected to and extending in a transverse array from the respective opposing ends of the belt, an elongated attaching element having a length that does not exceed the width of the belt, and first and second retaining means for retaining the attaching element in operative relationship with the loops to maintain the opposing ends of the belt in alignment and close proximity to each other. More specifically the method includes the steps of affixing the first retaining means to one end of the attaching element, threading the attaching element through the first and second series of loops until the first retaining means is in contact with a first outer loop and the distal end of the attaching element extends beyond the loops on the opposite side of the belt, placing the second retaining means on the other end of the attaching element, and affixing the second retaining means to the distal end of the attaching element under conditions where the second retaining means is contiguous with a second outer loop connected to the opposite side of the belt.

DESCRIPTION OF THE PREFERRED EMBODIMENT

Figure 1:
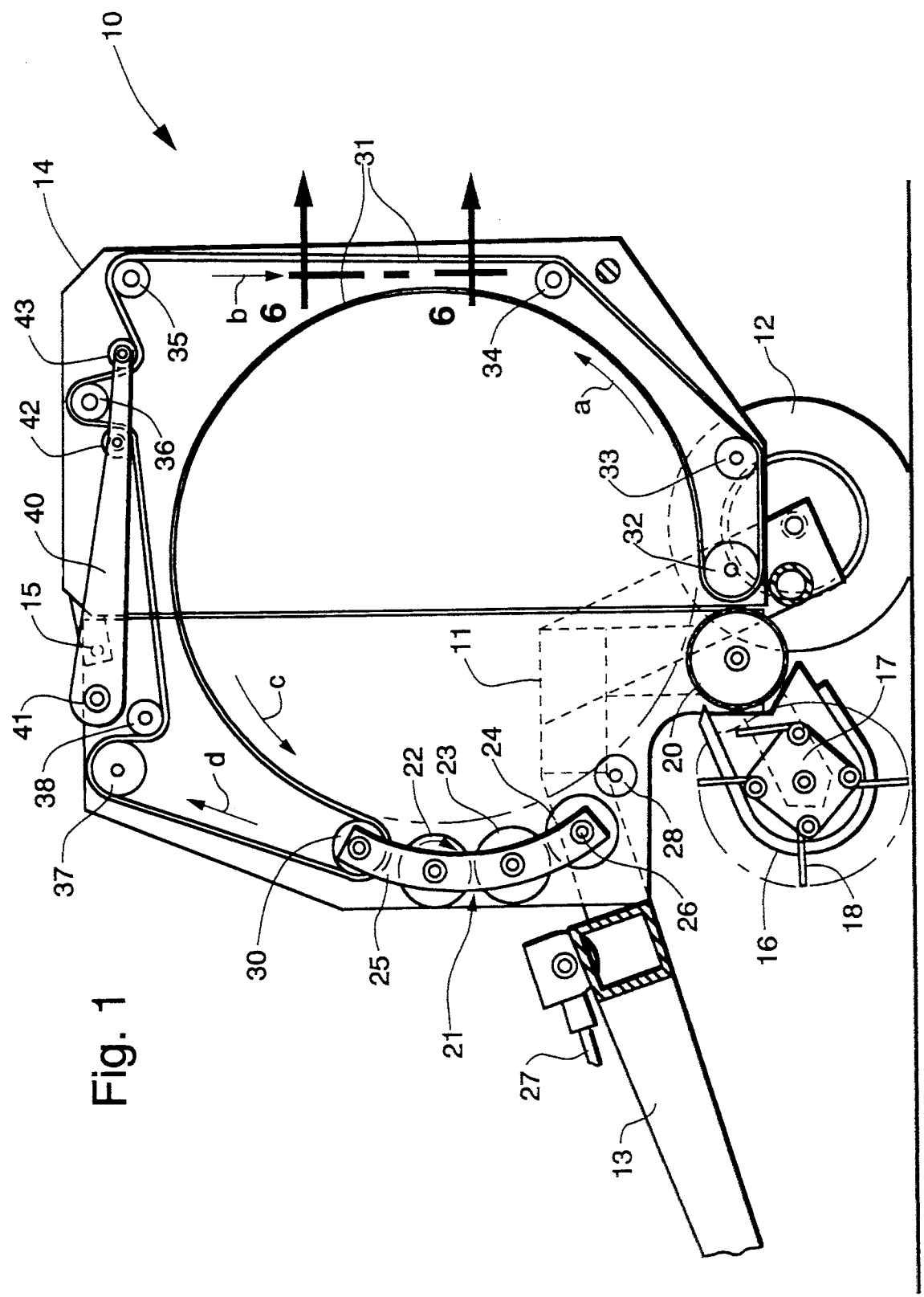
FIG. 1 is a diagrammatic side elevational view of an example of one type of round baler in which the present invention can be carried out.
Figure 2:
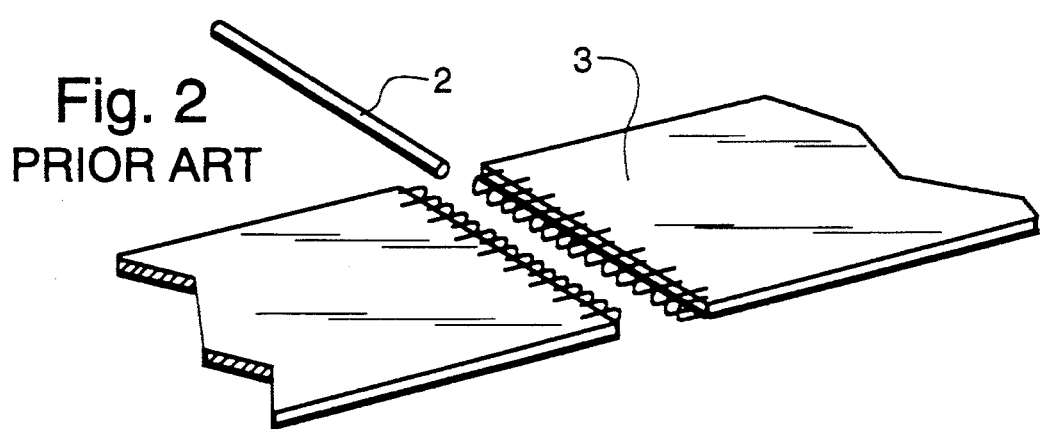
FIG. 2 is a perspective view of a prior art belt splicing method.
Figure 3:
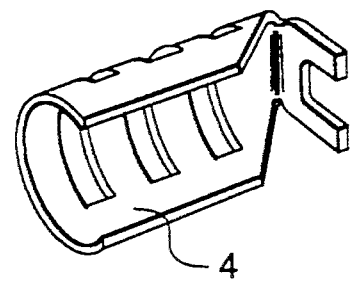
FIGS. 3–5 show diagrammatically another prior art belt splicing method.
Figure 4:
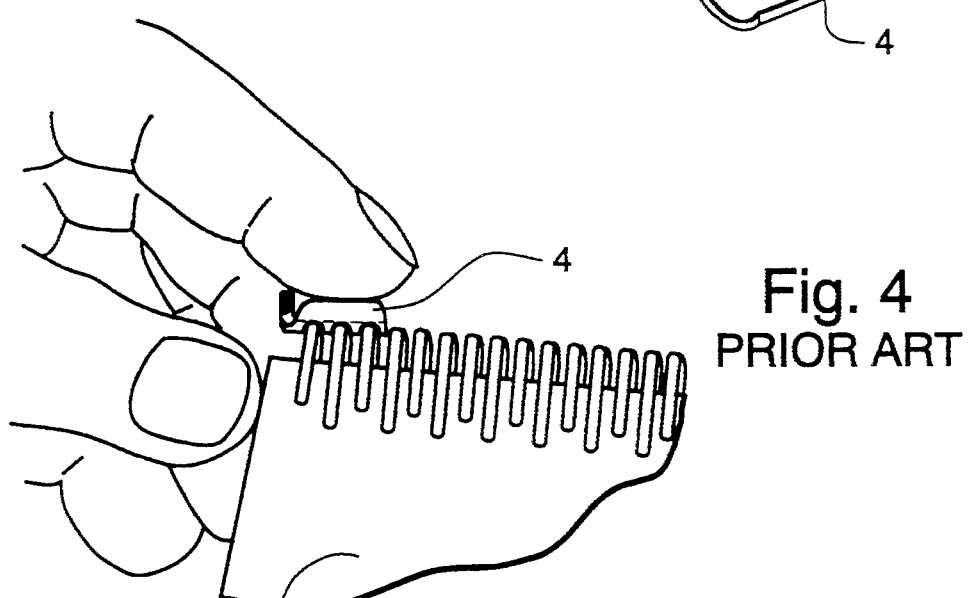
Figure 5:
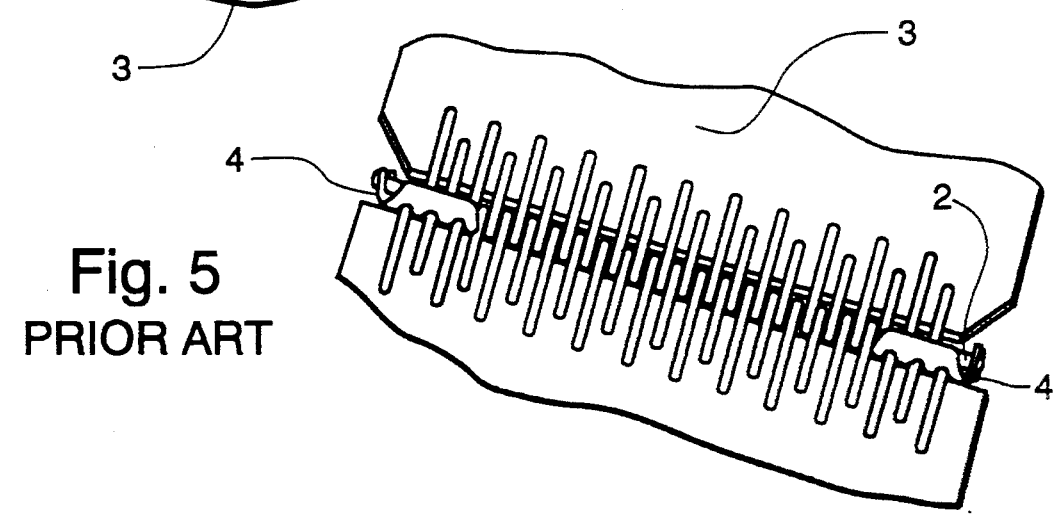

Referring now to the drawings for a more detailed description, FIG. 1 shows one type of expandable chamber round baler 10 in which the preferred embodiment of the invention is readily carried out. Baler 10 is disclosed in detail in U.S. Pat. No. 4,870,812 issued on Oct. 3, 1989 in the name of R. E. Jennings et al. It includes a main frame 11 supported by a pair of wheels 12. A tongue 13 is provided on the forward portion of main frame 11 for connection to a tractor. A tailgate 14 is pivotally connected to main frame 11 by a stub shaft 15 and a similar opposing stub shaft (not shown) so that tailgate 14 may be pivoted from the closed position shown in FIG. 1 to an open position shown and described in the mentioned Jennings et al patent. A conventional pickup 16, mounted on main frame 11 by a pair of brackets 17, includes a plurality of tines 18 moveable in a predetermined path (phantom outline) to lift crop material from the ground and deliver it rearwardly toward a floor roll 20 which is rotatably mounted on main frame 11.

The baler includes sledge assembly 21 having a plurality of transversely extending rollers 22, 23, 24 journalled at their ends in a pair of arcuately shaped opposing arms 25. Arms 25 are pivotally mounted on main frame 11 by a pair of stub shafts 26 for permitting movement of sledge assembly 21 between a bale starting position, shown in Jennings et al, and the full bale position shown in FIG. 1. Rollers 22, 23, 24 are driven in a clockwise direction (see arrow on roll 22) by conventional means (for example, chains and sprockets or gears) connected to a drive shaft 27 driven by the PTO of a tractor. A starter roll 28, located adjacent roller, 24 is also driven in a clockwise direction to enhance core starting and strip crop material from roller 24. A freely rotatable idler roller 30 is carried by arms 25 for movement in an arcuate path when sledge assembly 21 pivots between the bale starting position and the full bale position.

A plurality of side-by-side belts 31 are supported on guide rolls 32, 33, 34, 35, 36, rotatably mounted in tailgate 14 and a drive roll 37 which is rotatably mounted in main frame 11. Belts 31 pass between sledge roller 22 and idler roller 30 in engagement with idler roller 30. Roller 22, located in close proximity to belts 31, strips crop material therefrom. Coupling means (not shown) connect drive shaft 27 to drive roll 37 causing movement of belts 31 in the direction indicated by arrows a, b, c and d, the inner course of which is designated by arrows a & c. An additional guide roll 38 ensures proper driving engagement between belts 31 and drive roll 37. A pair of arms 40 (one shown) are pivotally mounted on main frame 11 by a cross shaft 41 for movement during bale formation between inner and outer positions, the outer full bale position being shown in FIG. 1. Arms 40 carry additional guide rolls 42, 43 for guiding belts 31. Resilient means (not shown) are provided to urge arms 40 toward their inner position while resisting movement thereof to the outer position. A complete description of baler 10 is provided in the Jennings et al patent.

For the purpose of the present invention, it should be generally understood that as round baler 10 is towed across a field, tines 18 lift crop material from the ground and feed it into the bale forming chamber via a throat defined by roller 28 spaced from floor roll 20. The crop material is conveyed by floor roll 20 into engagement with a series of inwardly facing moving surfaces comprising the inner course of the apron belts and rollers 22, 23, 24 and 28, whereby it is coiled in a counterclockwise direction to form a bale. During such formation, continued feeding of crop material into the chamber by tines 18 causes the apron belts 31 to expand until arms 40 rotate to their shown position. When a bale has been so formed, it is then wrapped with a suitable material, such as twine or net, tailgate 14 is opened and the bale is ejected. Subsequent closing of tailgate 14 returns apron belts 31 to their initial position (not shown) and round baler 10 is ready to form another bale.

Figure 6:
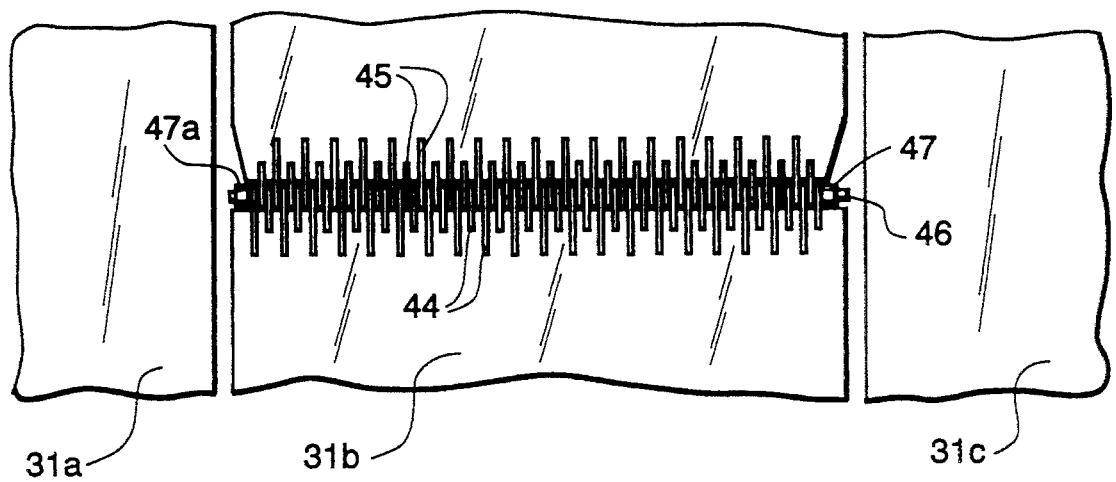
FIG. 6 is a view taken in the direction of arrows 6—6 in FIG. 1.
Figure 7:
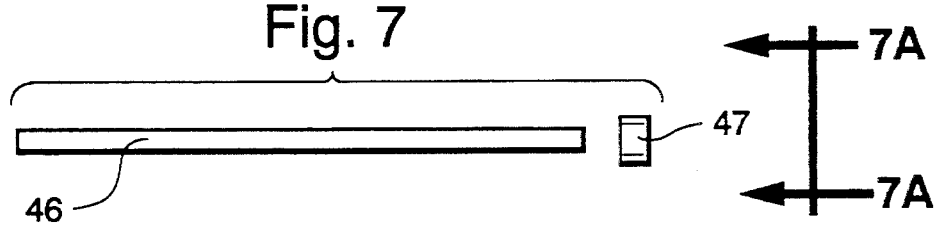
FIG. 7 shows an attaching element and retaining means used to splice round baler belts.
Figure 7A:
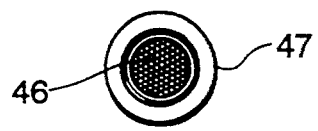
FIG. 7A is a view taken in the direction of arrows 7A—7A in FIG. 7.

Now turning to the belt splice to which the present invention is applicable, FIG. 6 shows a cut-away portion of three side-by-side belts 31, designated by reference numerals 31a, 31b and 31c. Each elongated belt 31 is formed into a continuous band by splicing the opposing ends together as shown for belt 31b in FIG. 6. Belts 31a and 31c are spliced at different locations along their length by a similar splice. The splice comprises a first series of side-by-side loops 44 secured to one end of belt 31b, a second similar series of side-by-side loops 45 secured to the opposing ends of belt 31b, an attaching element 46 and retention means 47, 47a affixed to the ends of element 46.

Figure 8:
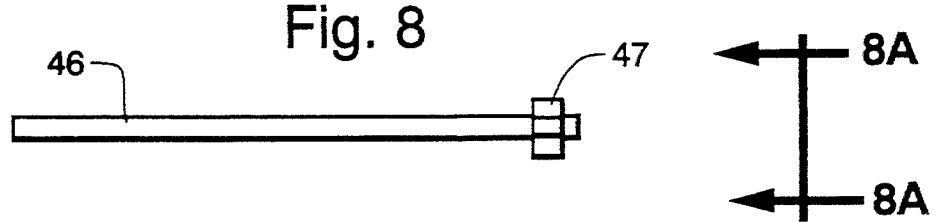
FIG. 8 is similar to FIG. 7 and shows the retaining means affixed to one end of the attaching element.
Figure 8A:
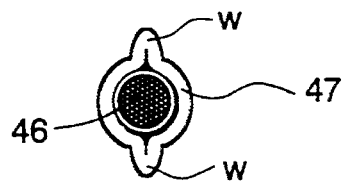
FIG. 8A is a view taken in the direction of arrows 8A—8A in FIG. 8.

More specifically, attaching element 46 consists of a length of cable equal to or slightly less than the width dimension of the belt. Retention means 47 consists of a thin walled tube having an inner diameter slightly greater than the diameter of the cable. The tube when crimped on the ends of the cable takes the shape shown best by FIGS. 8A and 9A, i.e., the circular ring shape is deformed to one having diametrically opposed wing-like portions w. The first series of loops 44 comprise loops (FIG. 9A) of wire extending a like distance from the end 48 of belt 31b. Likewise the second series of loops 45 comprise similar like loops of wire extending from the opposing end 50 of belt 31b. All loops 44 are anchored in the belt at ends 51, 52, 53 and 54 whereas ends 55, 56, and 57, 58, represent respectively, the ends of loops 45. Both series of loops anchor at depth locations that alternate along the width of the belt.

Figure 9:
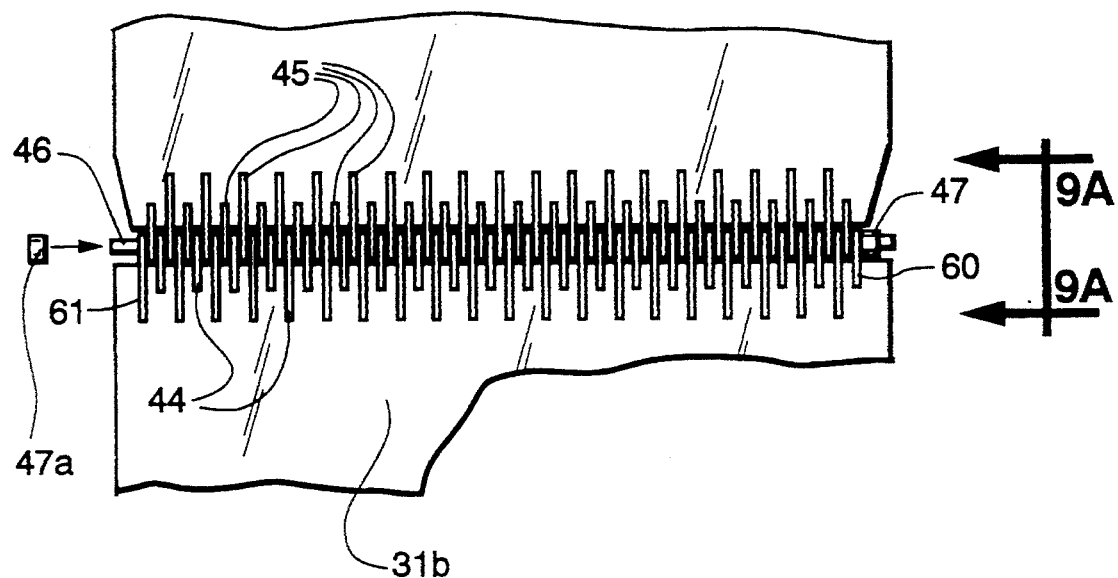
FIG. 9 is similar to FIG. 6 and shows the attaching element with retaining means attached to only one end.
Figure 9A:
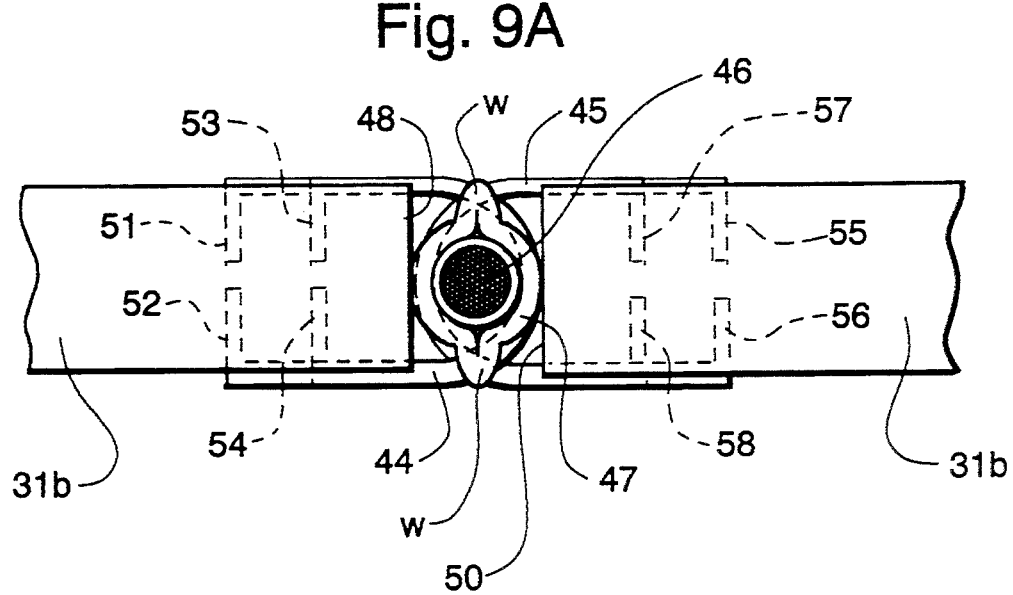
FIG. 9A is a view taken in the direction of arrows 9A—9A in FIG. 9.

In operation, the ends of belt 31b are spliced together by first abutting the opposing series of rings against the opposing belt end in a mating fashion to form a passage that receives attaching element 46, as best depicted in FIG. 9A. Retention means 47 is affixed to one end of element 46 (FIG. 8), and the combination is threaded through the intermeshing loops until 47 is in contact with end loop 60 (see FIG. 9). Retention means 47a is then placed on the distal end of element 46 by urging the thin walled tube coaxially along the cable until it is snug against outer loop 61 and then crimping it to element 46, resulting in the completed splice shown in FIG. 6.

It should be noted that during baler operation the spliced belt vibrates and flexes resulting in some instances in rotation of element 46, but regardless of the axial orientation of element 46 it is secured against transverse movement by virtue of the relationship of retention means 47 to the outer loops. In the event wear and manufacturing tolerances permit the distance between opposing ends 48 and 50 to increase slightly, then wings w will assist in maintaining the integrity of the splice if rotation of element 46 occurs.

It has been determined that round balers using belts spliced in accordance with the method of the present invention have reduced down time caused by belt failure. The belt ends are held in alignment and less likely to permit the attaching element to creep laterally due to the snugly fit, simply accomplished securement of the retention means to the cable, which method has been found to be most successful when the crimped retainer does not extend beyond the thickness or width of the belt and thereby avoids undesirable contact with rollers as well as belt side guides commonly used in round balers. Furthermore, this method reduces the likelihood of failure of the outer loops by obviating lateral outward movement of such outer loops.

Although many advantages are explicit and implicit in the above description it should be particularly noted that because of inherent problems of belt accessibility in round balers of the type involved, due to side walls, shielding, various mechanisms, etc., the simplicity of the described splicing method is an extremely important advantage.

While preferred baler structure including belt splicing means in which the principles of the present invention can be carried out is shown and described above, it should be understood that the invention is not so and, in fact, widely different baler structure of varying scope and configuration may be employed in the practice of the invention.

Having thus described the invention, what is claimed is:

1. A method for splicing a belt on a round baler having
   a frame,
   means for providing a bale forming chamber including one or more rolls mounted transversely on said frame, and at least one belt having opposing ends secured together to form a continuous band, said belt trained about and supported on said rolls to define said chamber, splice means for securing together said opposing ends of said belt, said splice means comprising a first and a second series of similar side-by-side loops connected to and extending in a transverse array from the respective opposing ends of said belt, an elongated attaching element having a constant cross-section throughout its length, and first and second retaining means for retaining said attaching element in operative relationship with said loops to maintain said opposing ends of said belt in alignment and close proximity to each other, said first and second retainer means being similar in configuration and adapted to encompass said attaching element, drive means for moving said belt in engagement with said rolls along a path that defines the outer periphery of said chamber, means for feeding crop material into said chamber to form a bale under conditions where said belt is moving in engagement with said crop material, and means for discharging said formed bale from said chamber, comprising the steps of affixing said first retaining means to one end of said attaching element by sliding said second retaining means axially along said attaching element, threading said attaching element through said loops until said first retaining means is in contact with a first outer loop and the distal end of said attaching element extends beyond said loops on the opposite side of said belt, placing said second retaining means on the other end of said attaching element, and crimping said second retaining means to said distal end of said attaching element under conditions where said second retaining means is contiguous with a second outer loop connected to opposite side of said belt.

2. A method as set forth in claim 1 wherein said first affixing step includes sliding said first retaining means axially along said attaching elements.

3. A method as set forth in claim 2 wherein said first affixing step further includes crimping said first retaining means to said attaching element.

4. A method for splicing belts on a round baler having at least one belt with opposing ends secured together by splice means to form a continuous band, said splice means comprising a first and a second series of similar side-by-side loops connected to and extending in a transverse array from the respective opposing ends of said belt, an elongated attaching element having a constant cross-section throughout its length and having a length that does not exceed the width of said belt, and first and second retaining means for retaining said attaching element in operative relationship with said loops to maintain said opposing ends of said belt in alignment and close proximity to each other, said first and second retainer means being similar in configuration and adapted to encompass said attaching element, comprising the steps of affixing said first retaining means to one end of said attaching element by sliding said second retaining means axially along said attaching element, threading said attaching element through said first and second series of said loops until said first retaining means is in contact with a first outer loop and the distal end of said attaching element extends beyond said loops on the opposite side of said belt, placing said second retaining means on the other end of said attaching element, and crimping said second retaining means to said distal end of said attaching element under conditions where said second retaining means is contiguous with a second outer loop connected to said opposite side of said belt.

5. A method as set forth in claim 4 wherein said first affixing step includes sliding said first retaining means axially along said attaching elements.

6. A method as set forth in claim 5 wherein said first affixing step further includes crimping said first retaining means to said attaching element.

* * * * *